April 3, 1934.  W. STUBBLEFIELD  1,953,693
FISHING REEL DRIVE
Filed Dec. 15, 1931  2 Sheets-Sheet 1

Inventor

Walter Stubblefield

By Clarence A. O'Brien
Attorney

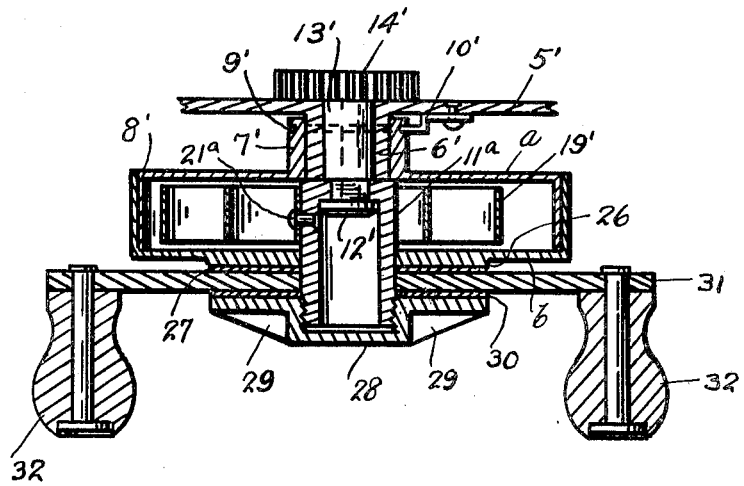
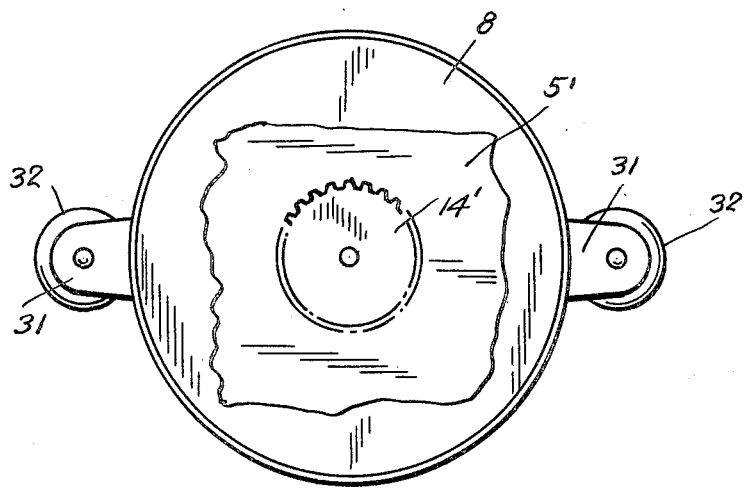

UNITED STATES PATENT OFFICE 1,953,693

FISHING REEL DRIVE

Walter Stubblefield, Roseburg, Oreg.

Application December 15, 1931, Serial No. 581,210

1 Claim. (Cl. 242—84.3)

This invention relates to an improvement in fishing reels, and more particularly to a novel drive.

The principal object of this invention is to provide a drive which may be readily attached to any standard single action or multiplying reel in place of the ordinary crank.

Another important object of the invention is to provide a fishing reel drive when in operation will take up the line approximately seven times faster than the simple reel and will retain constant and uniform tension on the line at all times.

Other important objects and advantages of the invention will become apparent to the reader of the following specification.

In the drawings:—

Fig. 3 represents a fragmentary detailed sectional view through a modified form of the invention.

Fig. 4 respresents an inside elevational view of the drive shown in Fig. 3.

Figure 1:
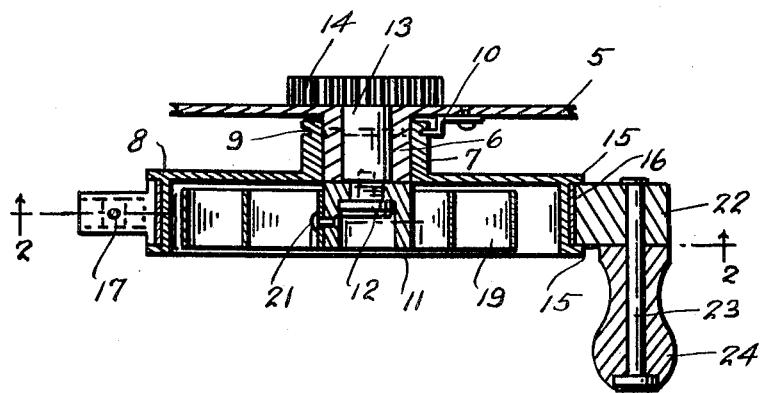
Figure 1 represents a fragmentary detailed sectional view through the drive.
Figure 2:
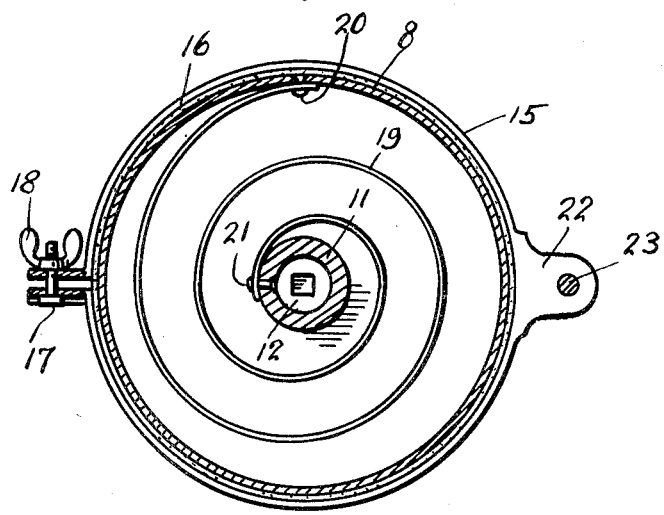
Fig. 2 represents a sectional view taken substantially on line 2—2 of Fig. 1.

Referring to the drawings wherein like numerals designate like parts, it can be seen in Fig. 1, that numeral 5 represents one end plate of a reel structure, the same being provided with an outwardly disposed bearing sleeve 6 for disposition into the cylindrical hub 7 on the drum 8, this hub 7 being provided with a circumferentially extending groove 9 adjacent its outer end to receive the retaining yoke 10.

Numeral 11 represents a cylindrical body provided with a reduced counter-bore for accommodating the key 12 which engages into the adjacent end of the stub shaft 13 of the drive gear 14, which in turn is secured to the reel rotor which is not shown in the drawings.

The periphery of the drum 8 is provided with a pair of parallel flanges 15—15 for preventing displacement of the clutch band 16, which is split, and provided with flanges at its ends apertured to receive the adjusting screw 17 which is equipped with the wing nut 18.

A coiled leaf spring 19 has its outer end secured to the inner side of the drum 8 as at 20 while the inner end of this spring is secured to the body 11 as at 21, the key 12 serving to positively connect the body 11 and stub shaft 13 in driving connection.

The intermediate portion of the band 16 is provided with a boss 22 having an opening therethrough to receive the pin 23 on which is secured the handle 24. Obviously, rotation of the drum 8 by the handle 24 results in the compression of the spring 19 until a driving connection is established between the body 11 and the shaft 13. Obviously, when a fish is hooked and makes a run the drive spring 19 is wound up and in this operation applies a steady tension to the line. When the spring is fully wound, the clutch will slip but will keep the application of the force of the drive spring uniform. Thus, the fish may make a run of any length as far as the reel is concerned.

When the fish stops or comes toward the reel, the drive spring 19 will automatically return the line for about fifteen feet, or until it is unwound. However, it is not necessary to wait until the spring is unwound before rewinding it, but it may be rewound as it becomes unwound.

This same spring action takes place in the form of the reel shown in Fig. 3. In this figure, it will be observed that numeral 14' represents the drive gear while numeral 5' represents the adjacent side of the reel structure, the same having the bearing sleeve 6' disposed into the circumferentially grooved hub 7' of the drum 8' consisting of sections a—b, the groove 9' of the hub being provided to receive the retaining yoke 10' which is carried by the wall plate 5'.

Numeral 11a represents a cylindrical body drive shaft which is positively connected at one end to the stub shaft 13' by the key 12'. The drum 8' is made of an inner and outer section forming a complete enclosure and has the outer end of the coiled spring 19' secured to the peripheral portion of the drum while the inner end of the spring is attached as at 21a to the drive shaft 11a.

The outer end of the drum 8' is provided with a latch plate formation 26 having suitable clutch members 27 thereon. The outer end of the drive shaft 11a is provided with threads for disposition into the threaded socket 28 of the plate 29 which is provided with a clutch plate 30 on its inner face.

Between the inner clutch faces 27 and 30 is the bar 31 which is provided with an opening at its intermediate portion to receive the aforementioned cylindrical body 11a. The plate 29 can be fed inwardly on the body 11a to secure the proper clamped action against the bar 31. The bar 31 is provided at each end with a handle 32 and obviously, under normal conditions, the winding action of the reel is obtained through the frictional clutch members 27—30.

When a pull occurs on the line of sufficient strength, the plate 29 will slip against the bar 31, while at the same time winding up the spring 19' which is secured at its ends to the cylindrical body 11a and the drum section a. Obviously, when the pull on the line ceases, and should the fish run in with the line, the wound spring 19' is capable of taking up about 15 feet (more or less depending on the size of the parts) before manual winding operation need be started.

While the foregoing specification sets forth the invention in specific terms, it is to be understood that numerous changes in the shape, size, and materials may be resorted to without departing from the spirit and scope of the invention as claimed hereinafter.

Having thus described my invention, what I claim as new is:—

A drive for fishing reels comprising a drive shaft, a reel connected stub shaft, a rotary drum, a coiled spring in the drum, the outer end of the spring being secured to the drum, the inner end of the spring being secured to the drive shaft, manual means rotatable on the drive shaft, and a clutch plate on the drive shaft between which and the drum the said manual means snugly fits.

WALTER STUBBLEFIELD.